United States Patent [19]

Kazlauskas

[11] 4,373,125
[45] Feb. 8, 1983

[54] APPARATUS FOR WELDING PIPES

[75] Inventor: Gasparas Kazlauskas, North Hollywood, Calif.

[73] Assignee: Astro-Arc Company, Sun Valley, Calif.

[21] Appl. No.: 817,999

[22] Filed: Jul. 22, 1977

[51] Int. Cl.² ............................................. B23K 37/02
[52] U.S. Cl. ................................ 219/60 A; 219/60 R; 219/61; 219/125.11
[58] Field of Search ...................... 219/60 A, 60 R, 61, 219/125.11

[56] References Cited

U.S. PATENT DOCUMENTS

| | | | |
|---|---|---|---|
| 3,188,445 | 6/1965 | Rieppel | 219/60 A |
| 3,193,656 | 7/1965 | Bell | 219/60 A |
| 3,207,881 | 9/1965 | Pagan | 219/60 A |
| 3,268,708 | 8/1966 | Thomas | 219/60 A |
| 3,753,525 | 8/1973 | Homes | 219/60 X |
| 3,783,223 | 1/1974 | Gwin | 219/60 A |
| 3,974,356 | 8/1976 | Nelson | 219/60 A |
| 4,015,086 | 3/1977 | Thatcher | 219/60 A |
| 4,019,016 | 4/1977 | Friedman | 219/60 A |

Primary Examiner—Richard R. Kucia
Attorney, Agent, or Firm—Robert E. Geauque

[57] ABSTRACT

A welding apparatus for pipes which provides for a guide means which is to be fixedly secured to the pipe adjacent the welding area, a first carriage and a second carriage is movably supported upon the guide means with each of the carriages supporting a pair of spaced apart welding heads. Attached to the guide means is a driving chain. Mounted on each of the carriages are motor means which, in turn, operate through the driving chain to move the carriages in a prescribed manner with respect to the guide means. The welding heads of each of the carriages move within the same plane but each are movable in a separate one hundred and eighty degree arc thereby forming a continuous circle. Associated with each welding head is a weld groove tracking system which automatically maintains each welding head correctly aligned within the welding groove. The entire apparatus of this invention, when combined with appropriate electronic computer equipment, automatically welds an adjoined pair of piping sections.

6 Claims, 20 Drawing Figures

DIRECTION OF TRAVEL →

4,373,125

APPARATUS FOR WELDING PIPES

BACKGROUND OF THE INVENTION

The field of this invention relates to the welding of separate metallic cylindrical tubular elements by the gas shielded tungsten electro-arc welding process. More particularly, this invention relates to the welding apparatus to automatically efficiently produce an extremely strong weld between piping sections.

Although the structure of this invention is designed primarily to weld piping sections of enlarged diameters, such as thirty inches in diameter, it is considered to be within the scope of this invention to use the structure and method of this invention on pipes smaller than thirty inches in diameter and also pipes larger than thirty inches in diameter. The inherent difficulty encountered in larger diametered pipes is that the pipe itself cannot be turned or rotated during the welding operation. This requires that the welding torches themselves to be rotated about the pipe. This means that gravity is a primary consideration in producing a satisfactory weld. The effect of gravity is readily apparent when it is considered that at the upper surface of the pipe the gravity has a tendency to draw the molten weld material toward the inside of the pipe while at the bottom of the pipe the gravity has the effect of having a tendency of pulling the molten weld material in exactly the opposite direction.

A desirable type of weld is a weld bead which is slightly raised on both the inside and outside surface of the pipe. Satisfactory penetration of the heat energy must occur to melt the edges of the piping and then with the addition of the filler wire completely fill the welding groove with an intermolecular bond occurring between the melted filler wire and the metallic material of the piping itself. Without satisfactory heat penetration into the piping, a poor quality weld will be produced and the resultantly formed pipe will be inherently weakened in this spot and a break can occur. The problem of welding larger diametered pipes is that gravity does have a definite effect on the welding process, since the welding material, for a short period of time, does become liquid and has a tendency to flow in a downward direction toward the earth. In any automatic welding process, compensation must be provided for gravity in order to produce a satisfactory weld at the upper surface of the piping as well as at the lower surface of the piping. Heretofore, there has not been sufficient emphasis placed on the effect of gravity, and the devices which have been designed to weld such larger diametered piping in a semiautomatic manner require a manual adjustment in order to compensate for the effect of gravity. The result is not a completely automatic welding process but a method which requires manual adjustment in order to compensate for gravity. This manual adjustment inherently introduces the possibility of human error which could be avoided by a completely automatic system.

The structure of this invention is found to be of particular utility in the area of constructing off-shore oil and gas pipeline. This pipeline is welded together on barges and then the pipeline is dispensed to be positioned at the bottom of the body of water. At the present time, there are four welders used to make a single three hundred and sixty degree weld pass in assembling of this off-shore pipeline. There are normally five or six separate welding stations on each barge and at each welding station there are four welders. In using the automatic welding apparatus of the subject invention, there would only be required to have a single welder per welding station.

SUMMARY OF THE INVENTION

The device of this invention is to be supported by an overhead crane at each welding station on a welding barge. The ends of the pipe were beveled slightly, approximately two degrees, are placed adjacent one another. A guide band is attached to the piping adjacent the welding groove. The carriage assembly is then attached to the guide means with there being two separate carriages each supporting a pair of welding heads. These carriages are supported from an overhead crane mechanism at each welding station. Each of the carriages are movable through a motor assembly upon a driving chain which is attached to the guide band. The motor mechanism, as well as operation of the welding heads, it controlled by a computer mechanism not directly forming a part of this invention and not described in any particular detail herein. The computer mechanism is deemed to be conventional. It just being understood that the computer controls the rate of movement of the carriages, the welding temperature, the rate of feeding of the filler wire, and the rate of feeding of the inert gas to the welding area.

The crux of this invention is believed to be summarily described in the Abstract of The Disclosure and reference is to be had thereto.

The primary objective of this invention is a machine to automatically weld, in an efficient manner, large diametered pipes in which the pipe is held stationary with the resultant produced weld being extremely strong.

DETAILED DESCRIPTION OF THE SHOWN EMBODIMENT

Figure 1:
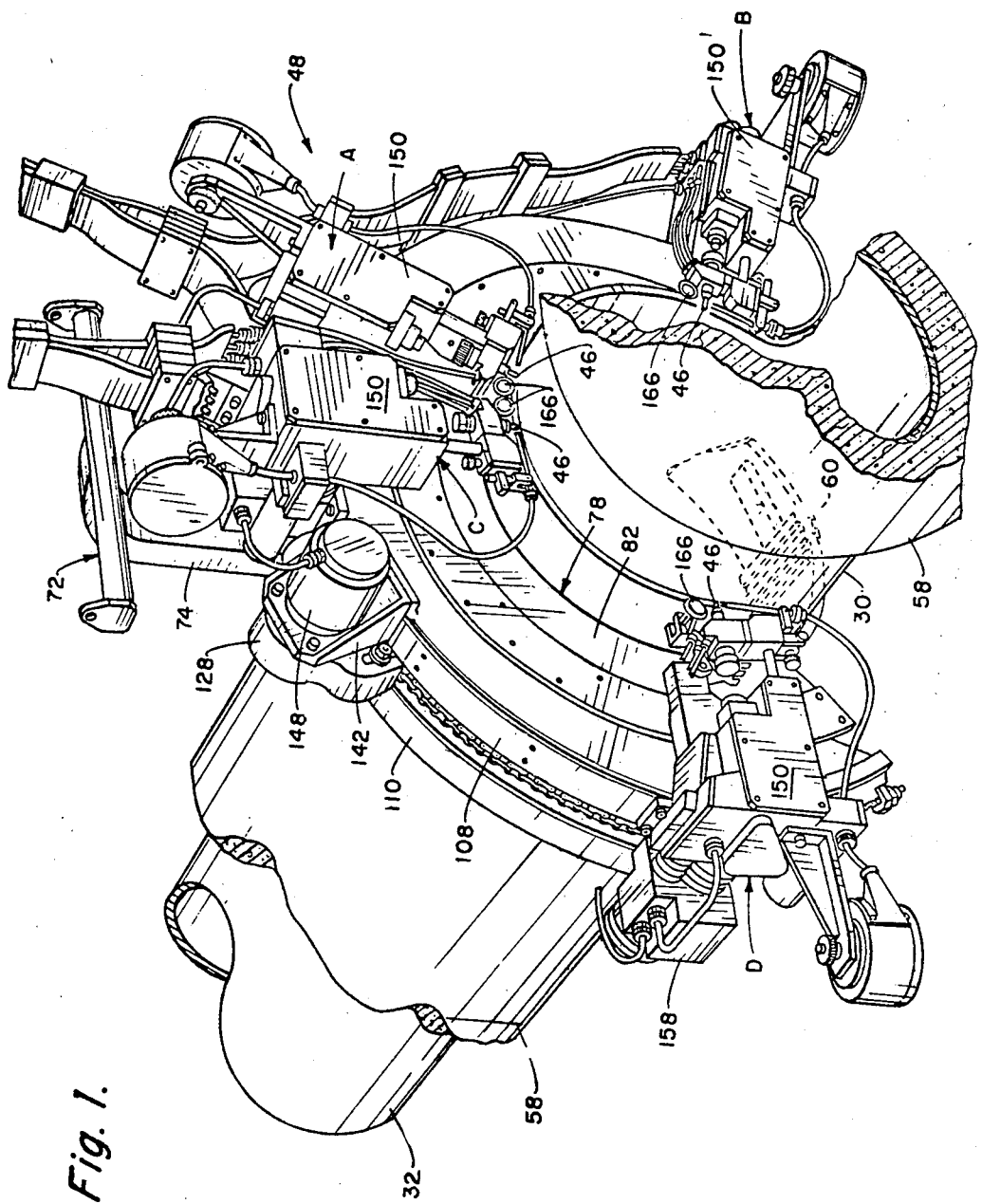
FIG. 1 is an overall isometric view of the welding apparatus of this invention as it is mounted upon a piping assembly.
Figure 2:
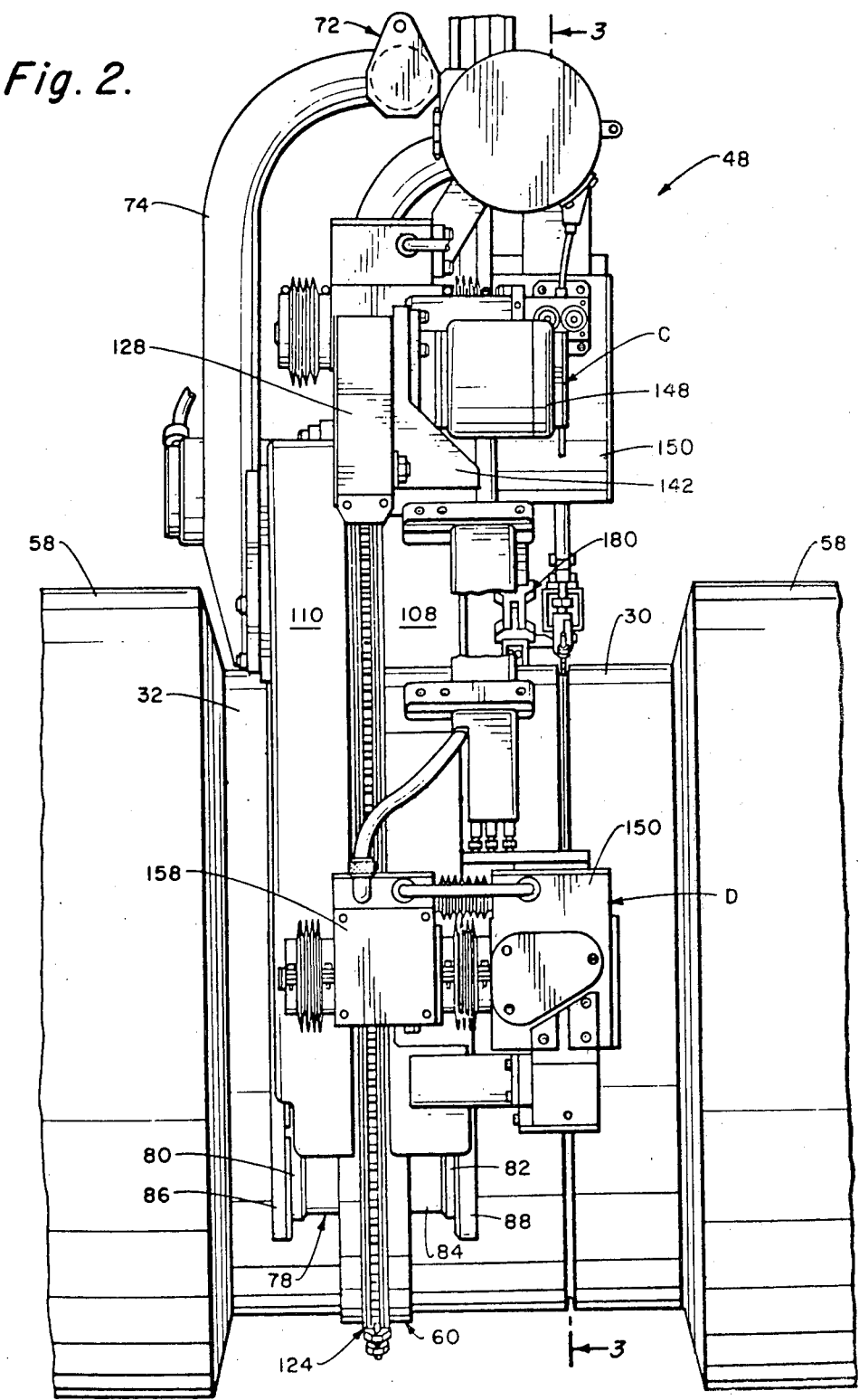
FIG. 2 is a left side view of the welding apparatus shown in FIG. 1.

Prior to discussing the apparatus of this invention in detail, the method of operation of this invention will be described. It is believed that the welding process incorporated within the welding apparatus of this invention is unique in that the ends of the pipes are beveled only very slightly so as to form a narrow welding groove where almost the sides of the welding pipe are vertical. In actual practice, the beveling of each side of the pipe is to be only three degrees so that the total bevel angle between the adjacent pipe sections is only six degrees. In normal welding operations heretofore, each end of the pipe would be beveled as much as thirty-seven to forty degrees so that the overall beveled angle between the adjacent sections of pipe which are to be welded together may be as great as seventy-five to eighty degrees. Previously, this type of weld angle was necessary so as to provide access by the welding electrode and its associated apparatus. Because this angle is so great, after the completing of the root pass weld, the width of the welding groove substantially increases with each subsequent pass. The result is there must be a substantial volume of filler wire supplied that is not necessary in the narrow groove welding technique of this invention. Additionally, it is normally necessary to have the welding electrode oscillate transversely during the welding operation which frequently can be eliminated in the narrow groove welding technique of this invention. Also, there is required a substantially greater number of welding passes within the previous wide angle beveling of the pipe ends that are completely eliminated in the narrow groove welding technique of this invention.

The narrow groove welding technique of this invention has been designed to be of particular use upon a stationary piping system wherein the welding operation is subject to the effect of gravity. During the welding, there is a weld bubble produced which is actually molten metal. This molten metal has the properties of a liquid and tends to flow under the effect of gravity. Therefore, at the top edge of the pipe the weld bubble will have a tendency to flow inwardly towards the interior of the pipe. At the sides of the pipe the weld bubble will have a tendency to flow along the welding groove. At the bottom of the pipe the weld bubble has a tendency to flow exteriorly of the welding groove. In the constructing of a satisfactory weld it is absolutely necessary that an annular raised section or bead be formed on both the inside of the piping as well as the outside of the piping when the weld is completed. With the effect of gravity being applied to the pipe, at the top surface of the pipe there will be a tendency for an enlarged weld bead formed on the inside of the pipe with no weld bead or a recessed area being formed on the outside of the pipe. Conversely, at the bottom side of the pipe there will be a tendency for an enlarged weld bead to be formed on the outer surface of the pipe with no weld bead being formed at the interior of the pipe. A weld of this type would be of poor quality and there is a great likelihood that after a period of time that a leak may very well occur within the welding joint.

The welding process of this invention substantially minimizes the effect of gravity on the welding operation. In the performing of the weld, there are three factors involved and these are: The welding current, the rate of movement of the welding electrode along the welding groove and the rate of feeding of the filler wire. The higher the welding current, the great volume of the weld bubble produced which is the molten or liquid metal created adjacent the tip of the welding electrode. The slower the speed of the electrode along the welding groove again increases the volume of the weld bubble. The rate at which the filler wire is fed into the weld bubble has a substantial effect on the weld bubble temperature since the filler wire is "cold" and also the physical movement of the filler wire into the weld bubble has a physical effect on the weld bubble by tending to move the weld bubble in the direction of the movement of the filler wire.

Taking into consideration the three previously mentioned factors, the welding process of this invention has evolved which substantially minimizes the effect of gravity on the welding procedure. The welding electrode is moved in steps, at rest for a period of time and then moved for a period of time and then at rest for a period of time and so forth. In actual practice, a preferable length of time for both the rest position and the movement position would be one second and one half second, respectively. A preferable rate for movement would be eighteen inches per minute during the time that it is being moved. However, it is to be understood that the time periods as well as the rate of movement can be readily varied depending upon the circumstances of the welding operation.

At the time the welding electrode is at rest, the welding current is increased to a higher level, such as for example, three hundred amperes. This welding current is maintained during the entire period of time that the welding electrode is at rest. During the time the welding electrode is moving, the welding current is decreased to a substantially lesser current, such as one hundred amperes. Again, these values are deemed to be readily variable as for certain situations the current may be as high as five hundred or more amperes with the lower value of the welding current being fifty or seventy-five amperes.

The filler wire is to be only fed into the weld bubble during the time that the welding current is at the higher level. In actual practice, it is preferred that the feeding of the filler wire be delayed a certain period of time after the welding current reaches the higher level. The welding current will normally be at the higher level for a period of one second which is the period of time that the welding electrode is at the "at rest" position. However, the filler wire is begun to be fed into the weld bubble after about one half second has elapsed of the total one second time. The filler wire is then fed into the weld bubble for the entire remaining one half second. The preferable rate of feed for the filler wire is one hundred and fifty inches per minute.

The foregoing values are specifically to be applied to the root pass as this pass is most important so as to obtain a raised annular bead on the inside of the pipe. During subsequent passes, these values will probably be changed, and in all probability the operation of each of the elements may also be changed. For example, in the subsequent passes, the feeding of the filler wire may be accomplished constantly with the welding current being also constant and the carriage moving at a constant rate. However, during the making of the root pass and following the foregoing procedure, the weld bubble is created and remains in place and is actually moved in an inward direction toward the interior of the pipe. Once this weld bubble is located in its preferred position, the welding current is immediately decreased and the welding electrode moved to a subsequent welding position. The filler wire is stopped from being fed into the weld bubble at the same time the welding current is decreased and also the welding electrode begins its movement to the next position. At this time, the welding bubble that was created and was pushed through the interior of the pipe immediately begins to solidify. This solidification acts rapidly so that there is very little effect of gravity on the weld bubble. If one were to examine the finished weld, one can see that at the top portion of the pipe the interior bead is of a slightly greater height than at the bottom portion of the pipe. From the interior surface of the pipe is typical weld bead will be raised one quarter to three-eighths of an inch. The difference between the raising of the weld bead from the top portion of the pipe to the bottom portion of the pipe may vary as much as one-eighth of an inch. It is only necessary that there be a slightly raised annular bead around the interior of the pipe in order to insure that a satisfactory weld is formed in all areas of the pipe. Therefore, at the bottom portion of the pipe where the effect of gravity is the greatest, if the weld bead is only an eighth of an inch high, that is of a sufficient height to insure a satisfactory weld.

Figure 10:
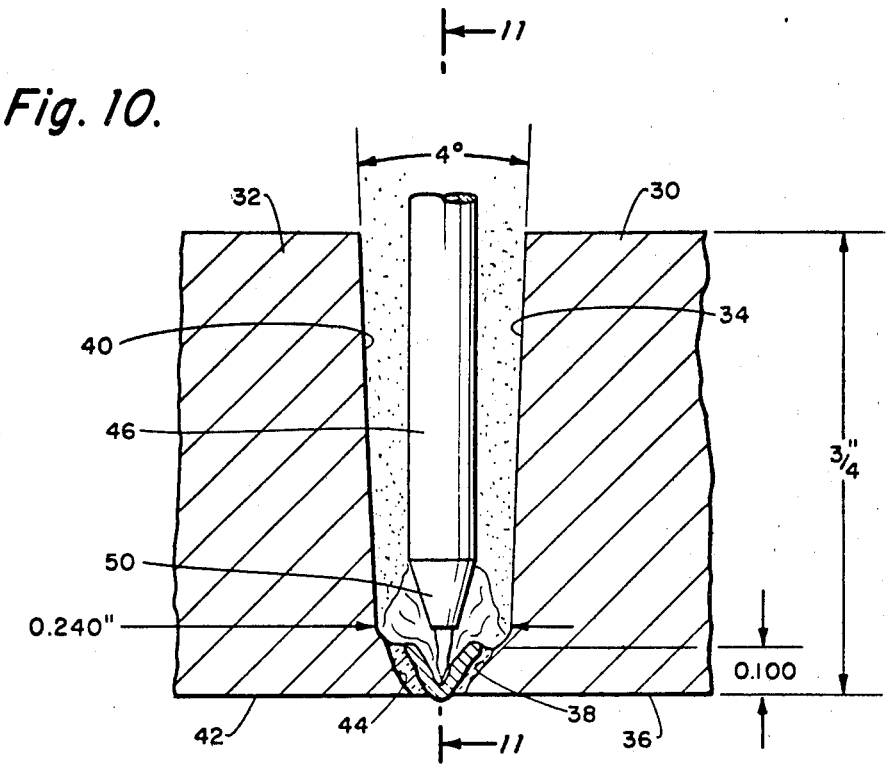
FIG. 10 is a cross-sectional view depicting the electrode position in making of the root pass for the weld.
Figure 11:
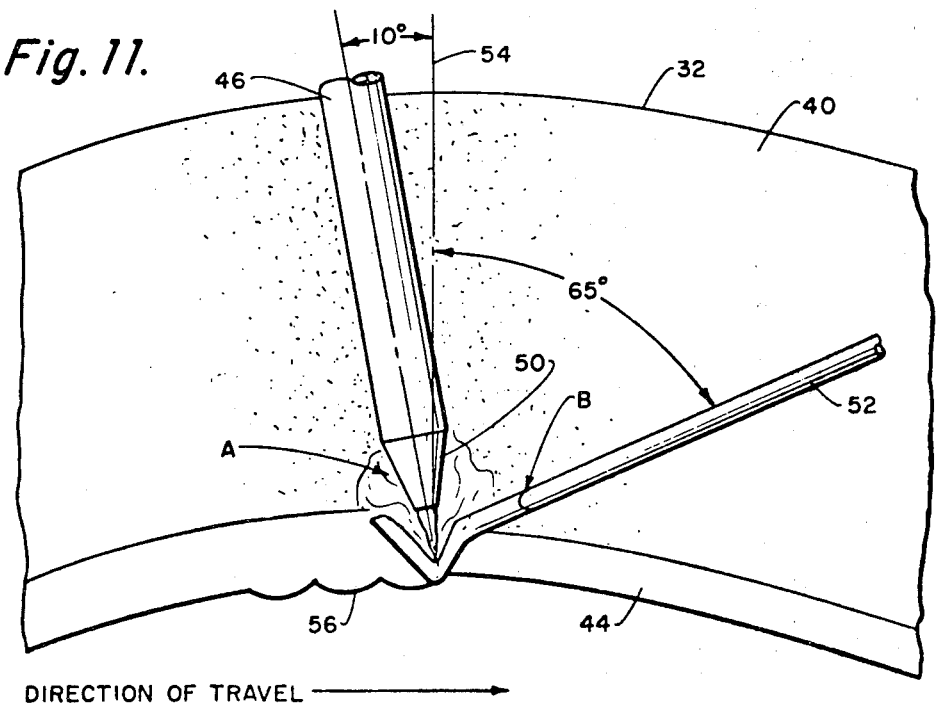
FIG. 11 is a cross-sectional view showing a side view of the welding electrode in the root pass position taken along line 11—11 of FIG. 10.
Figure 12:
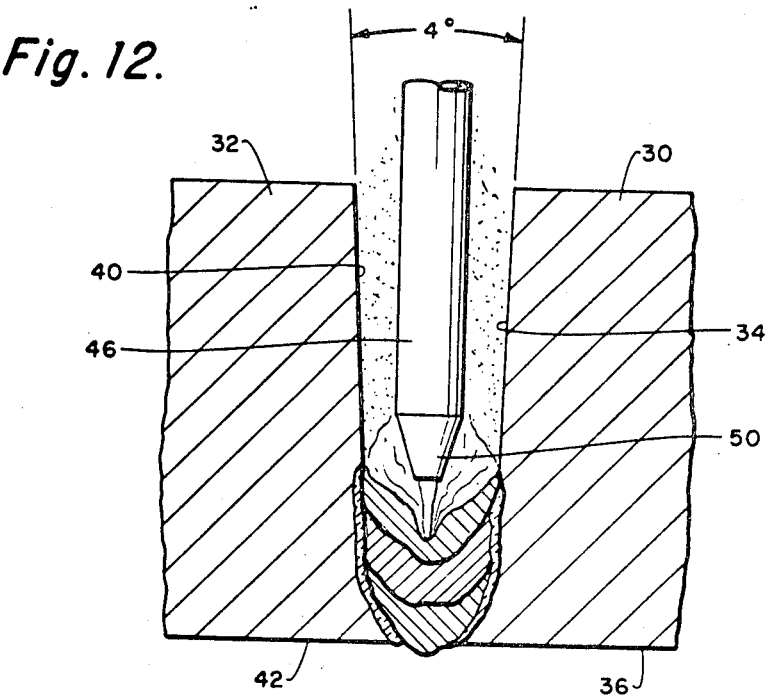
FIG. 12 is a view similar to FIG. 10, but showing the welding electrode in the filler pass position, the position other than the root pass.

Referring particularly to the drawings, FIGS. 10, 11 and 12, the welding procedure of this invention is shown. FIG. 10 is a cross-sectional view taken parallel to the longitudinal axis of the pipe assembly. The pipe assembly includes a pipe section 30 and pipe section 32. The edge 34 of the pipe 30 is beveled slightly at approximately a two degree angle until adjacent the interior surface 36, the edge 34 flares outwardly forming an annular ledge 38. In a similar manner, the edge 40 of the pipe section 32 is beveled slightly to a two degree angle and adjacent the interior surface 42 there is formed a annular flared ledge 44. The ledges 38 and 44 are placed directly adjacent one another with the longituduinal axes (not shown) of the pipe sections 30 and 32 being in alignment. The positioning is such that there is approximately one quarter of an inch between the edges 34 and 40 located adjacent the ledges 38 and 44. The height of the ledges 38 and 44 is one tenth of an inch. These measurements are for a pipe thickness of approximately three quarters of an inch.

Each welding electrode 46 within the apparatus 48 of this invention is to be positioned within the annular welding groove formed between edges 34 and 40 so that the tip 50 is positioned in close proximity to the ledges 38 and 44. The electrode 46 is inclined at approximately ten degrees into the direction of travel of the electrode. The filler wire 52 is to be supplied to the welding area, just forward of the welding tip 50, from a position forward of the electrode 46 at an angle approximately sixty-five degrees in respect to a line 54 passing vertically through the weld bubble. Line 54 is also a radius of the pipe assembly. The angular location of the filler wire is significant as the direction at which the filler wire is moved into the weld bubble has a physical effect on the placement of the weld bubble. In other words, the more flat the filler wire is inserted into the weld bubble the less the tendency of the weld bubble to be moved in an inward direction and form the annular weld bead 56 between the adjoining interior surfaces 36 and 42. The more direct the filler wire is inserted into the weld bubble, the greater the tendency that the weld bubble will be pushed to the inside of the pipe assembly thereby more likely to form an enlarged annular bead 56. The angle selected of sixty-five degrees has been found to be preferable to produce the desired size of annular bead on the interior of the pipe assembly.

In the welding technique of this invention, due to the high current intensities employed (above two hundred and fifty amperes), the arc develops an inner core or plasma jet. In making of the root pass, penetration is directly proportional to the welding current density and arc voltage. The current density at the tip of the tungsten electrode is an important factor. By the using of an electrode with a tapered tip and by having a closer electrode tip-to work relationship, the plasma jet action is increased by a rise in current. Therefore, in root pass welding, a control of arc plasma and plasma jet action provides the means of controlling the melt-through penetration of the weld. In the welding of a "narrow groove" design, there is a large amount of surface area of the groove when compared to the volume of the groove. This results in what is termed "high chill" configuration, meaning in essence there is a large area of "cold" metal to the volume of the welding groove. Such a high chill configuration has, in the past, been difficult to weld since such configuration demands more of the arc heat for preheating. However, such a high chill system can be welded at high welding speed by exact control of arc plasma, plasma jet action, and welding speed. This exact control can be provided through the use of electronic computers which is to operate the welding apparatus of this invention.

In making the root pass by the technique of this invention, the tungsten electrode is shown to be tilted approximately ten degrees in the direction of travel, as previously mentioned. The reason for this tilting of electrode is in order to better preheat the filler wire as it is being fed into the arc crater. The complete welding action is shielded with inert gas. The welding arc voltage between the electrode and the base metal is measured and compared with a preset reference voltage. The error, if any, is amplified and fed to a motor controled welding head which is to adjust the electrode toward or away from the base metal to thereby maintain constant arc voltage. The welding head apparatus with the automatic voltage control mechanism is not going to be described within the subject application in detail and reference is to be had to U.S. Pat. No. 3,777,115, issued Dec. 4, 1973, entitled APPARATUS FOR CONTROLLING ELECTRODE OSCILLATION and assigned to the assignee of the present invention. A similar welding head apparatus will be employed within this invention.

In the making of subsequent filler passes after making the root pass, the subsequent passes are usually accomplished in the direction opposite to the root pass. Also, the rate of travel will be increased and also the welding current is increased. In a similar manner, the rate of feeding of the filler wire will be appropriately increased.

Referring particularly to FIGS. 1 to 5 of the drawings, the welding head apparatus 48 of this invention is shown. The apparatus 48 is shown attached to a piping assembly which takes the form of pipes 30 and 32. Normally, the pipes 30 and 32 will include a cement outer covering 58. This outer covering 58 is spaced slightly from each end of the pipe so as to permit access to the metal pipe itself to weld together the piping sections. The diameter of the pipes 30 and 32 will normally be between either twenty-four inches or thirty inches. The thickness of the concrete 58 will be in the range of about three inches.

Fixedly mounted upon the pipe section 32 is a guide ring 62 which is formed of a thin metal material and is sufficiently flexible to be placed about the metal pipe 32. Positioned along the inward side of the guide ring 62 are a plurality of spaced apart feet 64. The feet 64 are to be in contact with the surface of the pipe 32.

The guide ring 62 is formed of a thin sheet of material and is flexible enough to be placed around the pipe. One end of the ring 62 is secured to a first bracket 66. Pivotally connected to the bracket 66 is a lever 68. The other end of the guide ring 62 is attached to a second bracket 70. A lever 68 connects with the second bracket 70 with there being a toggle type of movement between brackets 66 and 70 so as to pull in close proximity to one another the brackets 66 and 70 so as to tightly bind the guide ring 62 about the pipe section 32.

The remaining portion of the welding apparatus 48 of this invention is supported by an overhead hoist (not shown) which is connected to supporting rod assembly 72. Supporting rod assembly 72 is secured to supporting post 74 which is secured to a mounting plate 76. This mounting plate 76 is secured to main supporting member 78. The main supporting member 78 has side plates 80 and 82 which are fixedly secured to the sides of the band 62. Main support member 78 is located on the portion of the band 62 which is opposite the toggle connection. Arcuate length of each of the side plates 80 and 82 are equal and this length is only slightly greater than one hundred and eighty degrees so that the pipe section 32 can be readily placed within the confines of the guide ring 62. This means that only the portions of the guide ring 62 located adjacent the toggle connection is movable to an open position so as to permit access of the pipe 32 into the position shown in the drawings.

The side plates 80 and 82 are fixedly secured together by means of a connecting plate 84.

Attached on the outer side of the plate 80 is a guide plate 86. A similar guide plate 88 is attached to the side plate 82. Formed on the inside wall of the plate 86 is a groove 90 which comprises a segment of a circle. A similar segmental shaped groove 92 is formed on the inside wall of the plate 88. Within the groove 90 is fixedly secured a plastic strip 94. A similar strip 96 is fixedly secured within the groove 92. These strips 94 and 96 are formed of a low friction plastic material which is commonly sold under the name of Teflon. These strips, as will become apparent further on, will act as low frictional guides for an assembly which moves within the confines of the side plates 86 and 88.

Fixedly secured to the connecting plate 84 and located intermediate plates 86 and 88 is an upstanding center post 98. The post 98 extends substantially the same distance as the side plates 86 and 88 and is also arcuate. Fixedly mounted on each side of the post 98 are similar Teflon guide members 100 and 102. The guide members 100 and 102 are arcuate in configuration and are basically identical in construction to the members 94 and 96.

Also fixedly secured to the upright post 98 is a guide track 104 located on one side of the post with a guide track 106 located on the opposite side of post 98. Each of the tracks 104 and 106 are mirror images of each other and also take the form of a segment of a circle and extend substantially the total length of the upright post 98 which is slightly greater than one hundred and eighty degrees.

Movably located between the guides 100 and 96 is located a first carriage 108. Movably located between the guides 94 and 102 is a second carriage 110. the carriages 108 and 110 are also arcuate in configuration and are basically in the shape of a segment of a circle and extend approximately one hundred and eighty degrees. There is a very close tolerance between the guides 96 and 100 and the surfaces of the carriage 108. The same is true between the guides 94 and 102 with the carriage 110. However, because of the nature of the material of the guides, there is a low frictional sliding movement of both of the carriages 108 and 110.

Figure 4:
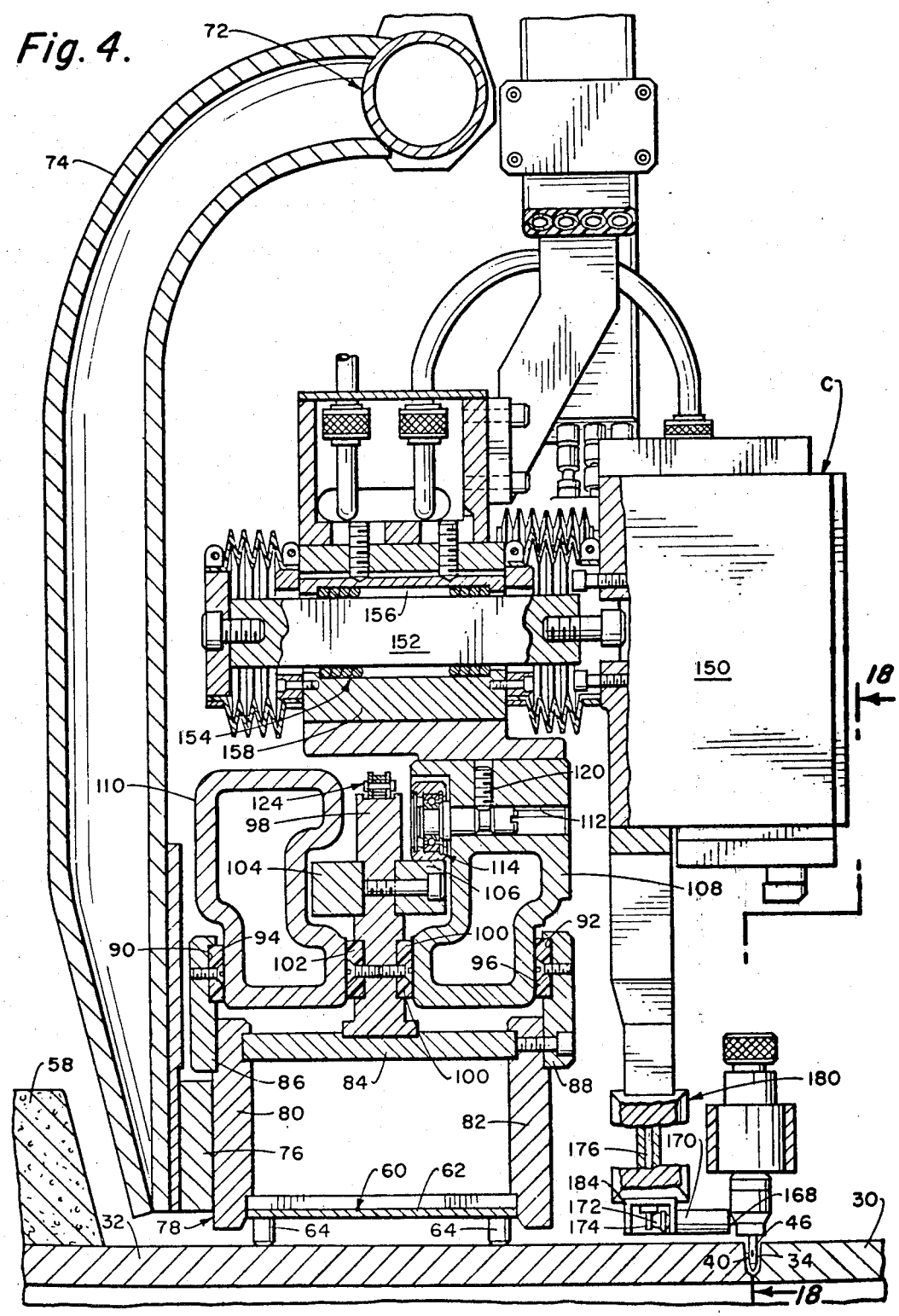
FIG. 4 is a cross-sectional view through one of the welding heads employed within the device of this invention taken along line 4—4 of FIG. 3.
Figure 5:
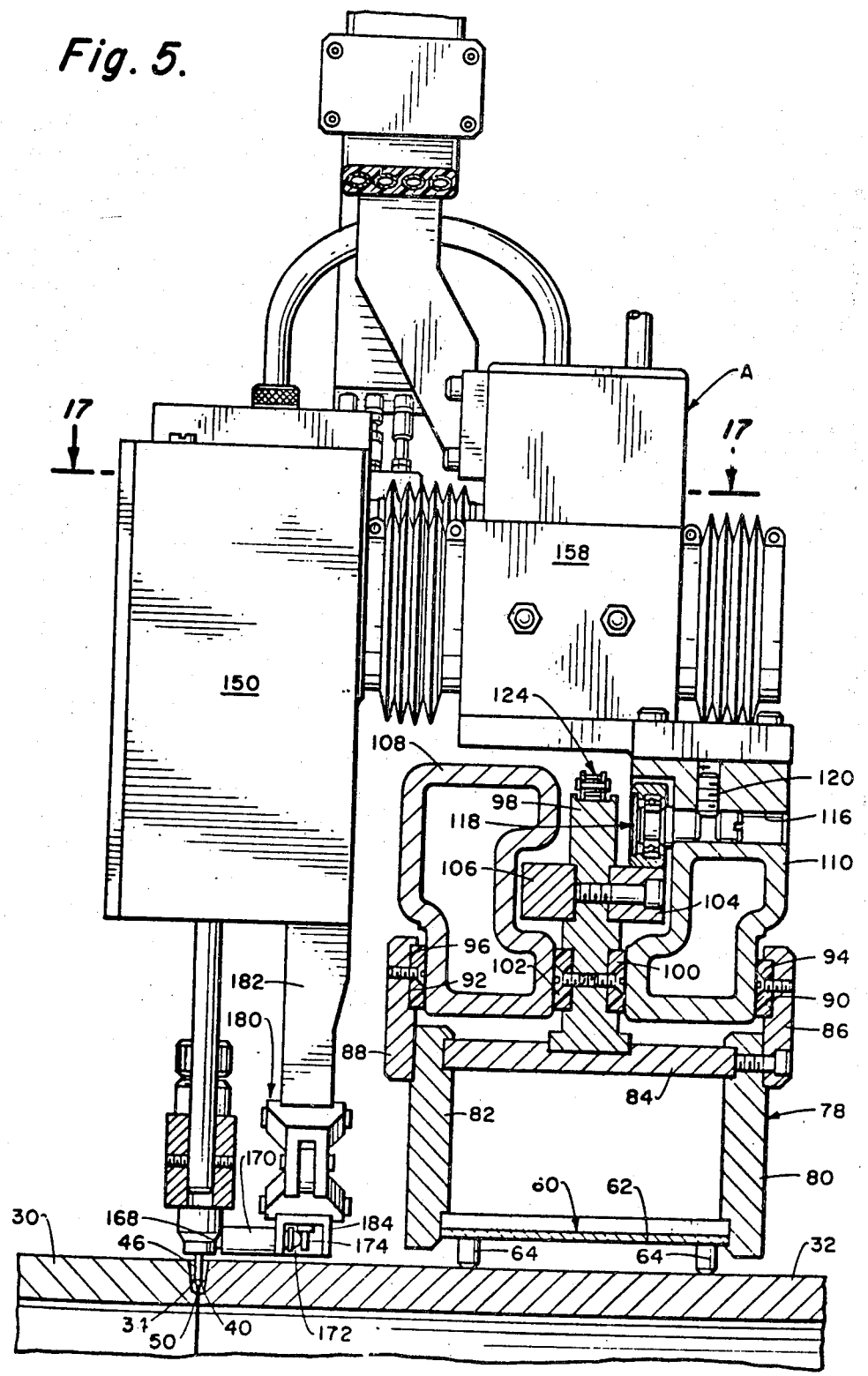
FIG. 5 is a cross-sectional view taken through another one of the welding heads employed within the device of this invention taken along line 5—5 of FIG. 3.
Figure 8:
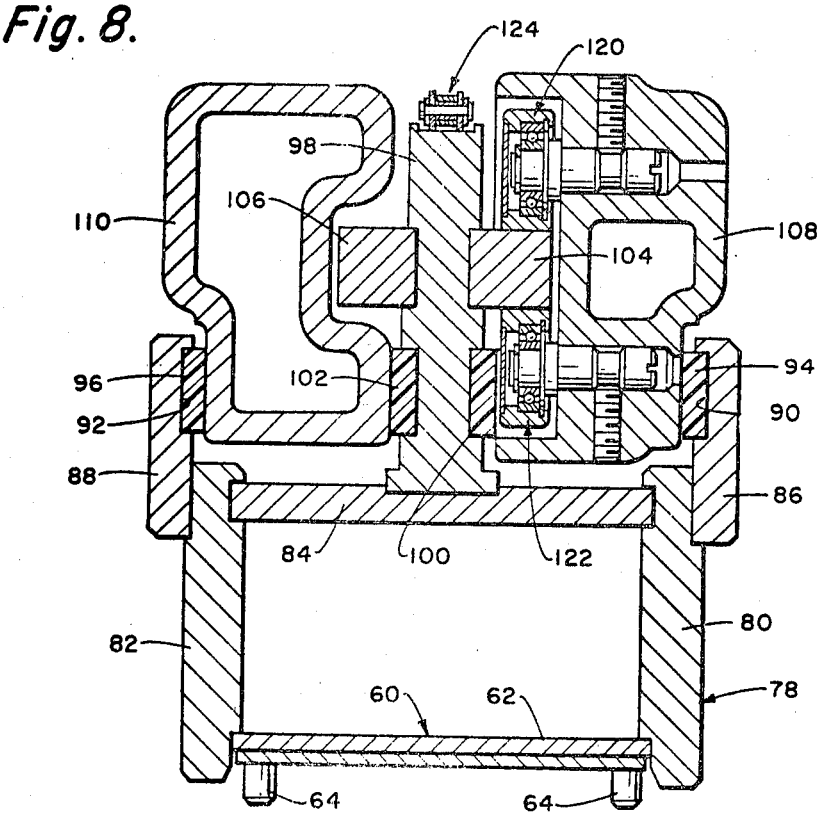
FIG. 8 in a cross-sectional view through the carriage ring assembly used to support the welding heads taken along line 8—8 of FIG. 3.
Figure 9:
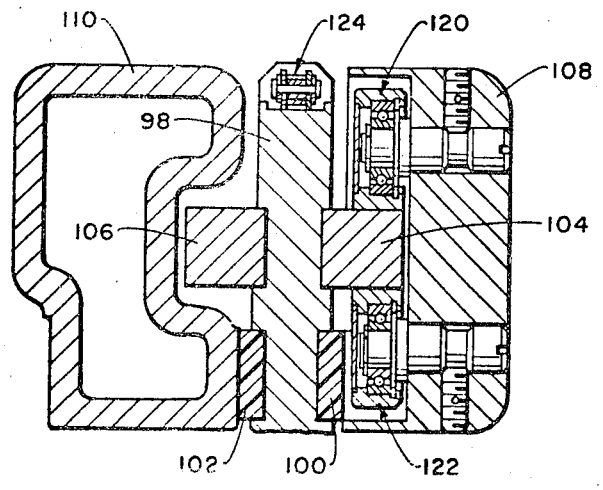
FIG. 9 is a cross-sectional view taken through one end of the carriage ring assembly taken along line 9—9 of FIG. 3.

Each carriage, 108 and 110, includes a series of transverse openings therein, such as opening 112 shown in FIG. 4 of the drawings, into which is mounted a low frictional roller bearing assembly 114. A similar such opening 116 is provided within the carriage 110 as shown in FIG. 5 of the drawing into which is located a similar bearing assembly 118. Each of the bearing assemblies 114 and 118 are fixedly secured in position by a set screw 120. Referring in particular to FIGS. 8 and 9, there are similar such roller bearing assemblies shown within the carriage 108, these roller bearing assemblies being referred to generally as an upper roller bearing assembly 120 and a lower roller bearing assembly 122. These bearing assemblies are mounted in similar transverse openings provided within the carriage 108 and are fixedly positioned with respect thereto by means of set screws. It is to be noted that in some instances you will have an upper and lower assembly like that shown in FIGS. 8 and 9 and in other instances it will be just a single roller bearing assembly as shown in FIG. 5. The selection and placement of each roller bearing assembly within each carriage 108 and 110 is considered to be a matter of choice and it is to be understood that a plurality of such roller bearing assemblies will be employed in order that each carriage is adequately supported upon its respective track 104, 106. It is to be understood that each of the roller bearing assemblies will be in contact with either track 104 or 106, with the lower bearing assemblies being in contact with the underneath side of the track and with the upper bearing assemblies being in contact with the upper side of the track.

Figure 3:
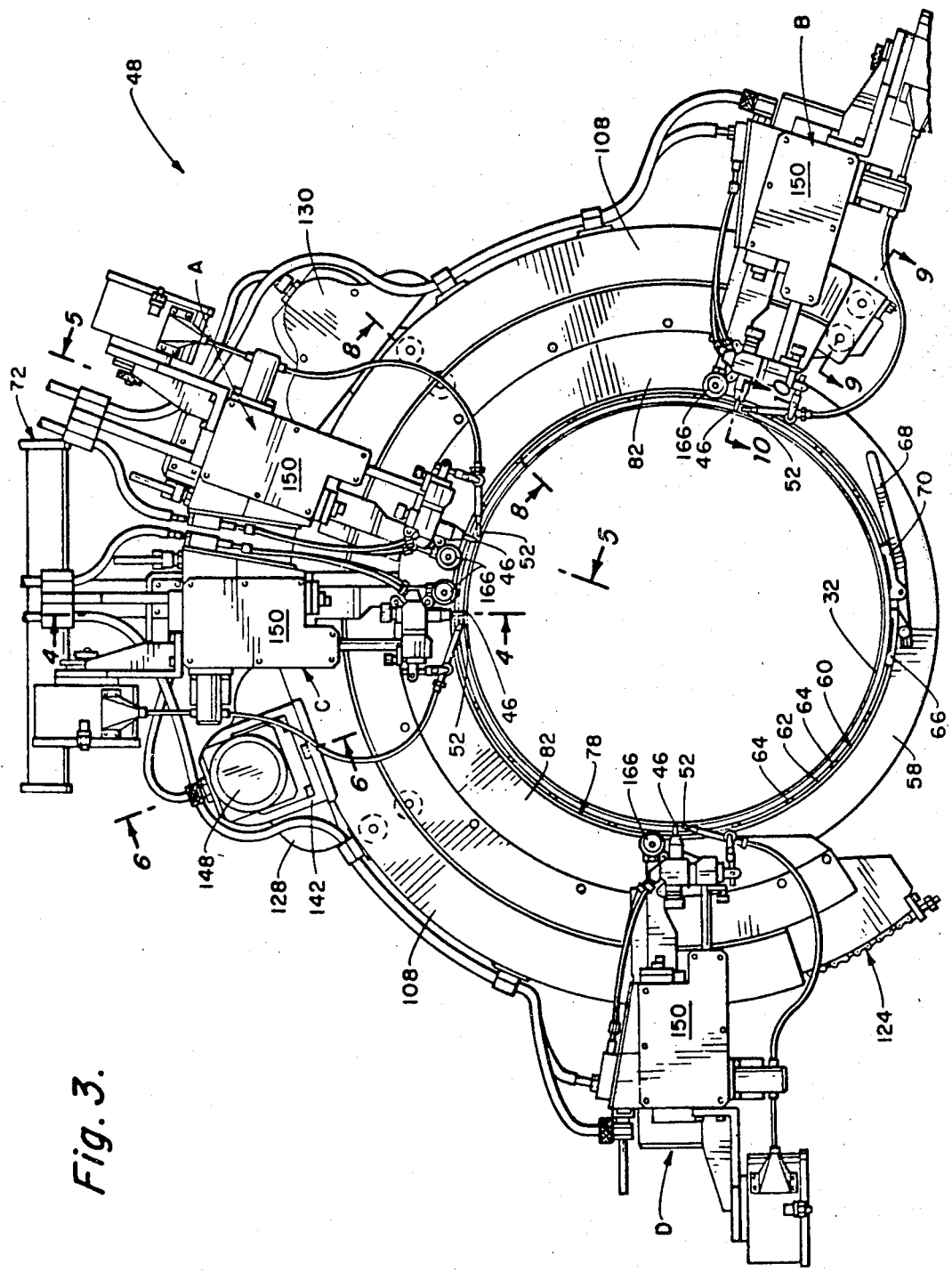
FIG. 3 is a cross-sectional view taken along line 3—3 of FIG. 2 through the welding groove.
Figure 6:
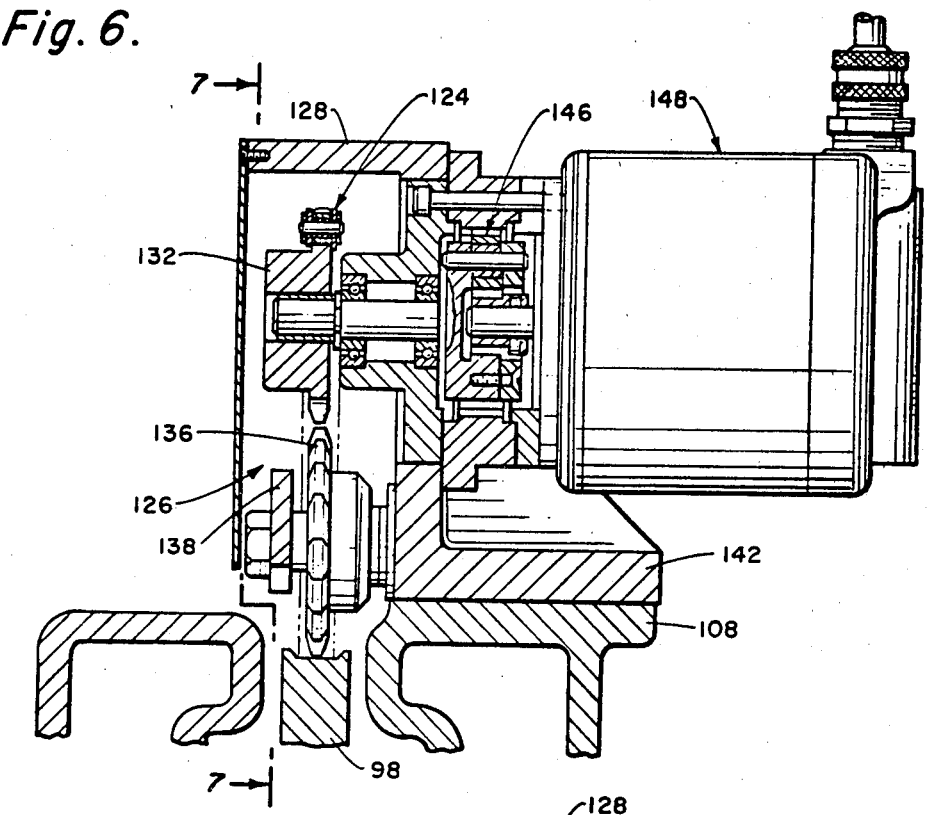
FIG. 6 is a cross-sectional view through the drive motor assembly for one of the supporting carriages employed within this invention taken along line 6—6 of FIG. 3.
Figure 7:
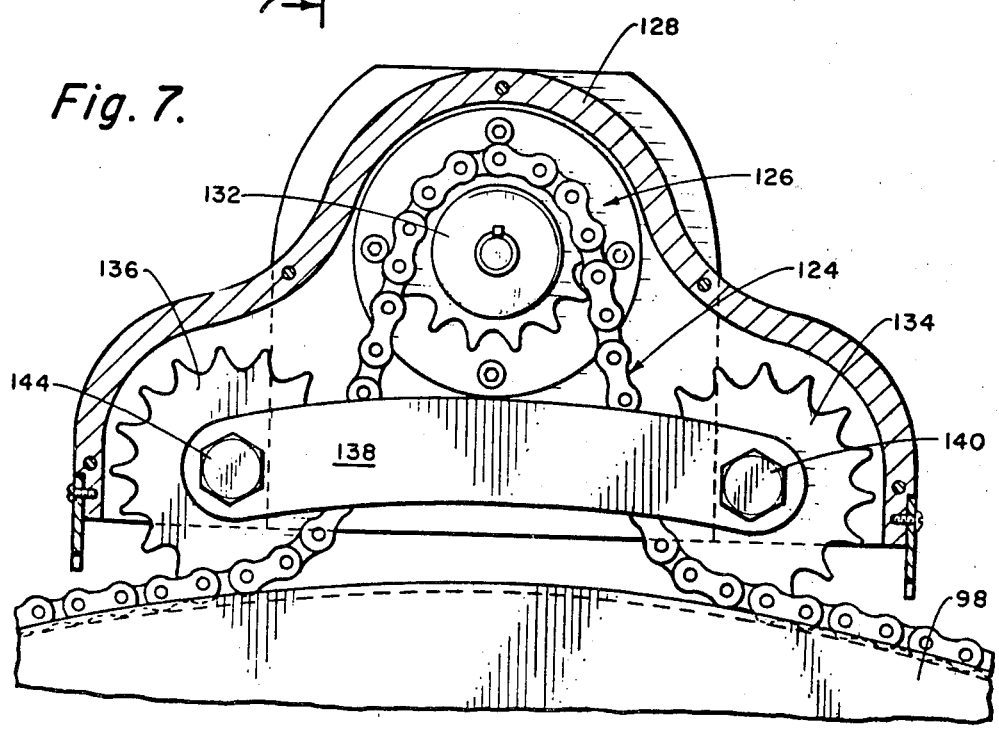
FIG. 7 is a partly in cross-sectional view taken along line 7—7 of FIG. 6 showing in more detail the driving assembly for one of the movable carriages employed within the device of this invention.

Fixedly mounted upon the upper surface of the post 98 is a driving chain assembly 124. The length of the chain 124 extends the entire length of the upper surface of the post 98. Also, each end of the chain 124 is secured at each end of the post 98. This chain 124 is connected with a plurality of driving sprocket assemblies, such as sprocket assembly 126 shown in FIGS. 6 and 7 of the drawings. There is to be one such driving sprocket assembly for each carriage 108 and 110. The driving sprocket assembly 126 is the one connected to the carriage 108. There is a similar driving sprocket assembly (not shown) for the carriage 110. The driving sprocket assembly 126 is shown placed within a cover 128. The driving sprocket assembly for the carriage 110 which is not shown is covered by cover 130 which is shown in FIG. 3 of the drawings.

Each driving sprocket assembly is identical with respect to each other. The driving sprocket assembly 126 includes a drive sprocket 132 and idler sprockets 134 and 136. The idler sprockets 134 and 136 are interconnected by a connecting rod 138. The sprocket 134 is rotatably supported upon a bolt 140 which passes through an opening provided within the connecting plate 138, through the center of the sprocket 136 and is fixedly secured to cover 128. In a similar manner, a bolt 144 is conducted through an appropriate opening provided within the connecting rod 138 and passes through the center of the sprocket 136 and is fixedly secured to the cover 128. The housing 142 is fixedly secured to the first carriage 108.

The driving sprocket 132 is rotatably driven through a planetary gear system 146 by means of a motor 148. This motor is to be driven by the computer apparatus previously mentioned which is not shown. Rotation of the motor causes rotation of the drive sprocket 132 which, in turn, moves the sprocket 132 in respect to the chain 124. Since the chain 124 is fixed, the housing 142 and the carriage 108 are caused to move. This means that the carriage 108 is moved upon the bearing assemblies 120 and 122 which ride upon the track 104. Noting in particular FIGS. 1 and 3 of the drawings, there are welding head assemblies A and B attached to carriage 110 and are adapted to move therewith. These welding head assemblies A and B are basically identical in configuration and as shown in FIG. 3 of the drawings, welding head A is adapted to weld the portion of the welding groove located between twelve o'clock and three o'clock, with welding head assembly B being adapted to weld the portion of the welding groove from three o'clock to six o'clock.

Attached to carriage 108 are welding head assemblies C and D. These welding head assemblies C and D are basically identical in configuration to welding head assemblies A and B. The welding head assemblies C and D are adapted to move along with carriage 108. Looking at the pipe assembly in the direction as shown in FIG. 3 of the drawings, the welding head assembly C is adapted to weld the portion of the weld groove between nine o'clock and twelve o'clock with welding head D being adapted to weld the portion of the weld groove from six o'clock to nine o'clock.

Figure 13:
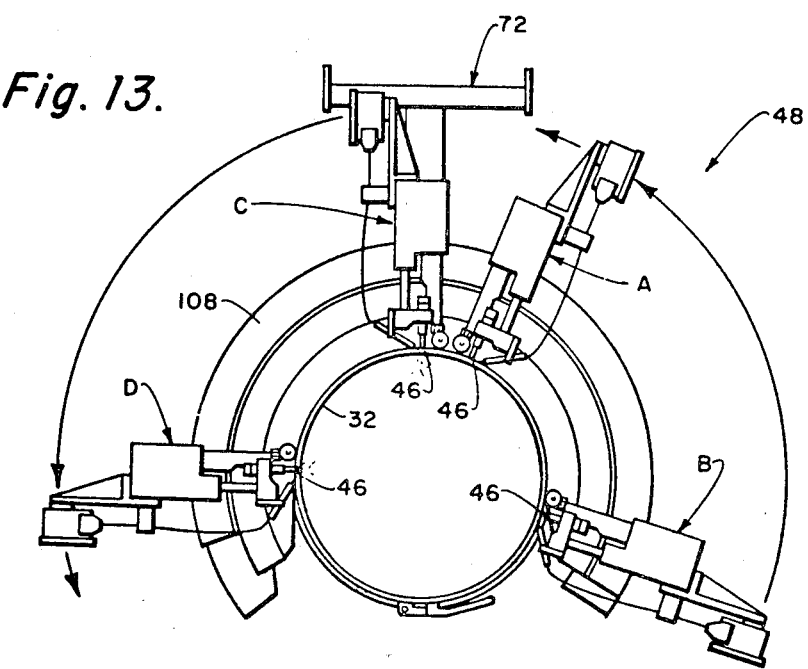
FIG. 13 is an end schematic view of the welding apparatus of this invention showing such in the initial welding position.

Prior to describing in detail the welding head assemblies, the computer mechanism (not shown) is to control the movement of the carriages 108 and 110 in a precise manner so that the entire welding groove will be welded and also in the movement of the carriages there is no interference between the welding heads mounted on one carriage and the welding heads mounted on the other carriage. In examining the structure shown in FIG. 1, it is readily apparent that welding heads A and C could interfere with one another at the upper portion of the pipe assembly. In a similar manner, the welding heads B and D could interfere with each other at the lower portion of the pipe assembly. In order to overcome this possible interference, the following movement procedure has been instituted. Reference is to be had to FIG. 13 of the drawings in which the initial position of the carriages is shown. Welding head C is located at twelve o'clock with welding head D being located at the nine o'clock position. Welding head A is slightly spaced from the twelve o'clock position and at approximately a one o'clock position. Welding head B is located not at three o'clock, but at a four o'clock position. It is believed to be readily apparent from the foregoing that welding head C and D are spaced ninety degrees from each other and are constantly maintained in this spacing because they are fixed to the carriage 108. In a similar manner, welding heads A and B are spaced ninety degrees from each other and are maintained in this spacing due to being fixed to carriage 110.

Figure 14:
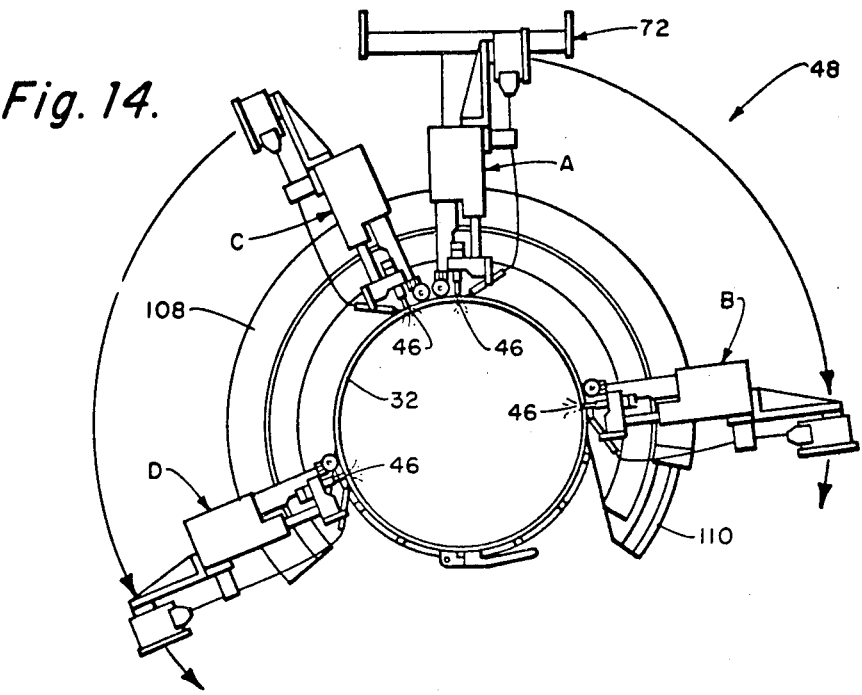
FIG. 14 is a view similar to FIG. 13, but showing the apparatus of this invention in a first intermediate position.

At the beginning of the welding procedure, welding heads C and D are activated and each begins welding within the welding groove. The electrodes 46 of the welding heads C and D are shown activated within FIG. 13. Upon the welding heads C and D being activated, the carriage 108 is moved in a counterclockwise direction. Simultaneously, with the movement of carriage 108, the carriage 110 is also moved in a counterclockwise direction until welding head A reaches the twelve o'clock position. This overall position is shown in FIG. 14. At this time, welding heads A and B are automatically activated and their respective electrodes 46 begin welding. During this time, carriage 108 continues its movement in the counterclockwise direction.

At this particular time, carriage 110 then begins to move in the clockwise direction. During this time, each of the welding heads are activated.

Figure 15:
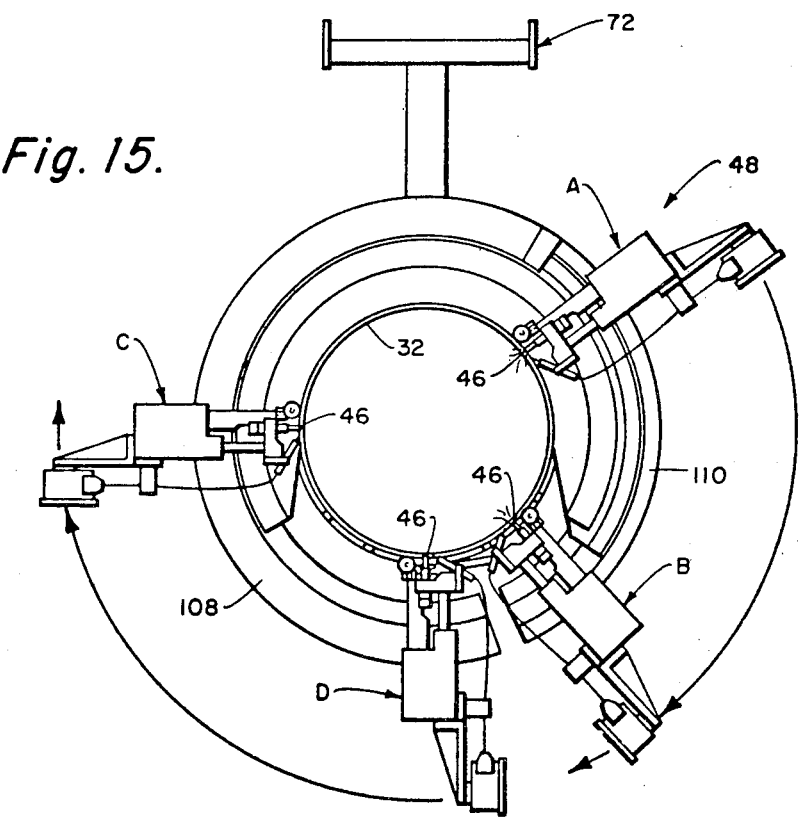
FIG. 15 is a view similar to FIG. 13, but showing the apparatus of this invention in a second intermediate position wherein the one pair of welding heads has completed the welding operation.

When welding head D reaches its six o'clock position, both welding heads C and D will be deactivated. At this time, the carriage 108 is then moved in a clockwise position to return back to the initial position shown in FIG. 13. This position is shown in FIG. 15 of the drawings. Carriage 110 is still moving in the clockwise direction.

Figure 16:
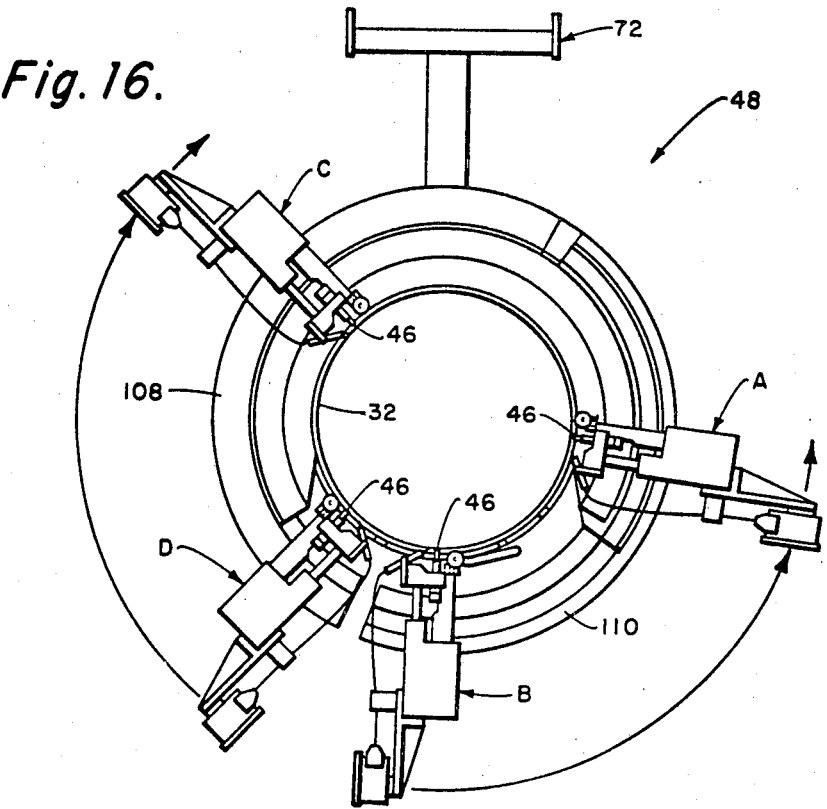
FIG. 16 is a view similar to FIG. 13 showing all welding heads having completed the welding operation.
Figure 17:
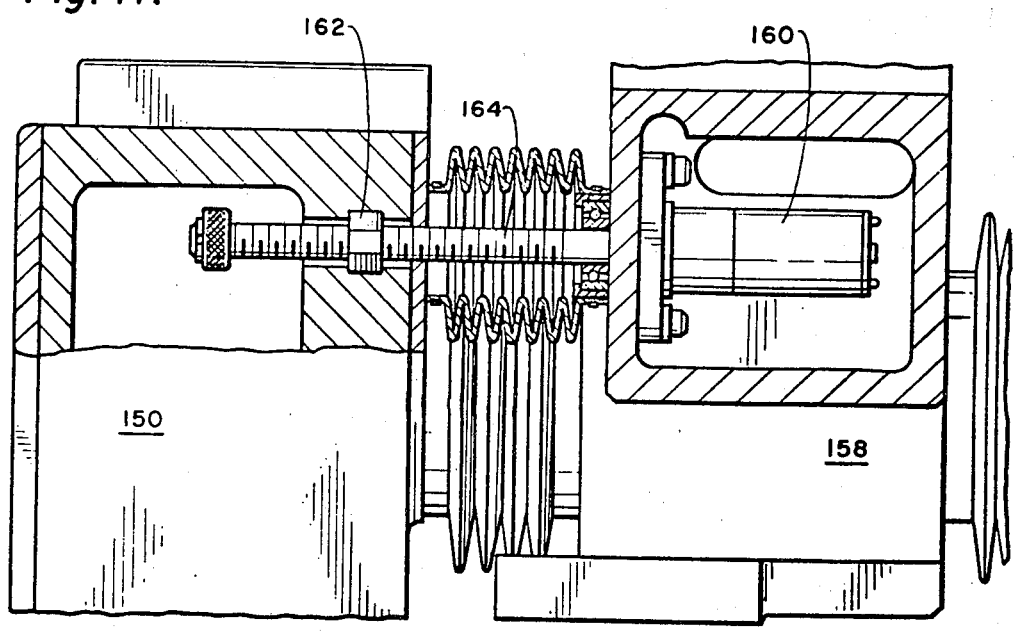
FIG. 17 is a cross-sectional view taken along line 17—17 of FIG. 5 showing the motor driven arrangement for the welding head housing.
Figure 18:
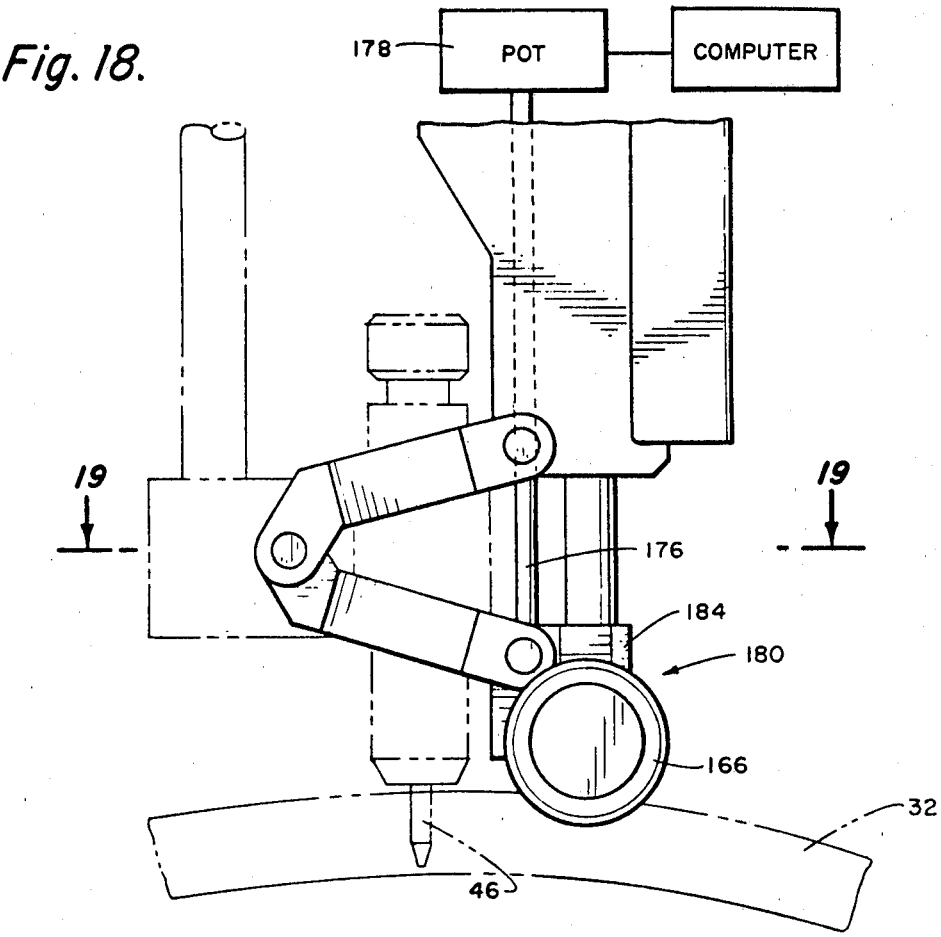
FIG. 18 is a view taken along line 18—18 of FIG. 4 showing the welding groove tracking device included within this invention.
Figure 19:
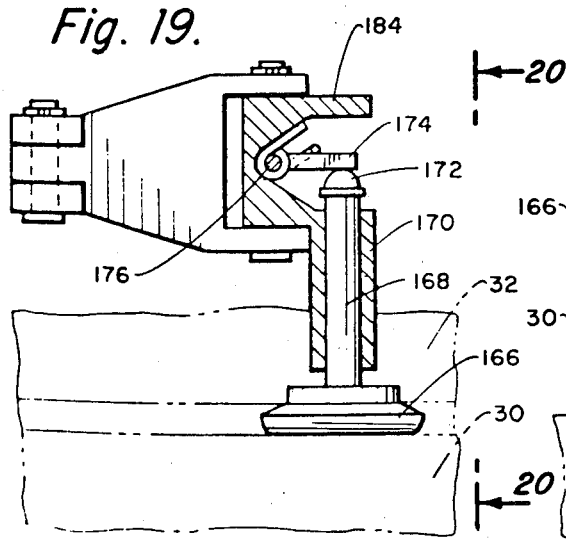
FIG. 19 is a cross-sectional view taken along line 19—19 of FIG. 18.
Figure 20:
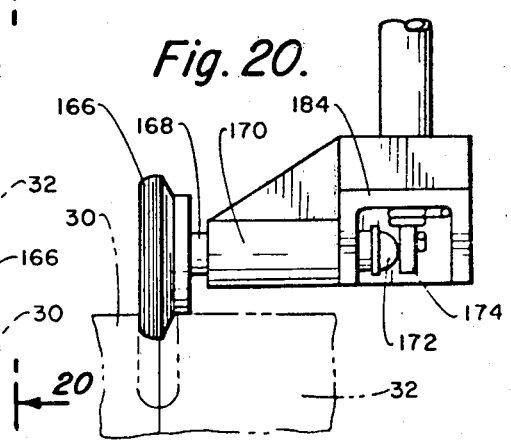
FIG. 20 is a view taken along line 20—20 of FIG. 19.

Referring in particular to FIG. 16 of the drawings, welding head B has now reached also the six o'clock position and at such time both welding heads A and B are deactivated. Therefore, carriage 110 then begins the return movement in the counterclockwise direction to the position shown in FIG. 13.

At this time it is to be readily apparent that a three hundred and sixty degree welding operation has been performed on the pipe assembly. This has been accomplished automatically and upon return of the carriages to the position shown in FIG. 13, the apparatus 48 can then be used to make another welding pass upon the welding groove or can be removed from the pipe assembly and the pipe assembly then moved to another location. It is to be understood that if the device is removed from the pipe assembly the hoisting assembly (not shown) which is attached to the supporting rod assembly 72 will be used to disassociate the device 48 from the pipe assembly.

Each of the welding heads A, B, C and D include structure basically similar to the defined structure of U.S. Pat. No. 3,777,115, issued Dec. 4, 1973 entitled APPARATUS FOR CONTROLLING ELECTRODE OSCILLATION and assigned to the assignee of the present invention. Basically, each of the welding heads include motor structure to move the welding electrode 46 either closer to the welding area or further away from the welding area. Also, there may be included structure to oscillate the welding electrode 46 transversely across the welding groove. Structure to effect vertical movement of the electrode and also oscillatory movement of the electrode has been described in the previously mentioned patent and reference is to be had to the aforementioned patent for a description of such structure. It is to be understood that the position of the electrode 46 is determined by a feedback of the welding current to the computer (not shown). The computer would compare the actual welding current to a predetermined value of welding current and then apply to an appropriate servo system a signal to control a motor which, in turn, would move the electrode to bring the welding current in line with the pre-established value.

Each of the welding heads A, B, C and D include a housing 150. Within the housing 150 is stored most of the mechanism to achieve the movement of the electrode. The housing 150 is secured to a square shaped rod 152. The rod 152 is movably supported by a bearing assembly 154 within a chamber 156 located within a junction box 158. The junction box 158 is fixedly attached to its respective carriage 108 or 110.

Because of the bearing assembly 154, the housing 150 is capable of movement toward and away from junction box 158. This movement is actually controlled by a motor 160 which is operated by the computer (not shown). The motor 160 includes a shaft 164 which is not rotatably mounted within a nut 162. The nut 162 is fixedly positioned within the housing 150. Therefore, it can be seen that by rotation of the motor 160, the nut 162 is moved linearly along the motor shaft 164. This, in turn, causes the housing 150 to move either toward or away from the junction box 158.

The purpose for this movement is to keep the electrode 46 positioned within the center of the welding groove. This is accomplished by a welding groove tracking mechanism which includes the use of a wheel 166 located forward of the welding electrode 46 If the wheel contacts one side or the other side of the welding groove, a mechanism is activated which causes the producing of an electrical signal which is transmitted through the computer mechanism to the motor 160 which, in turn, causes rotation of the motor shaft 164 in either one direction or the other direction so that to move the welding electrode 46 to the middle of the welding groove. Only a very slight pressure of either surface of the welding groove on the wheel 166 will result in an immediate appropriate corrective action and move the electrode 46 to the desired position.

The wheel 166 is mounted on a shaft 168 which is slidably mounted within sleeve 170. The shaft 168 terminates in a cam surface 172. The cam surface 172 is in contact with a lever arm 174. The lever arm 174 is fixedly connected to a vertically located rod 176. The rod 176 is connected to a potentiometer 178. The rod 176 is spring biased to a null position and this null position is recorded by the potentiometer. This null position is achieved when the wheel 166 is not in contact with either surface of the welding groove. Upon the wheel 166 coming into contact with either surface resulting in the shaft 168 moving either in an outward direction or in an inward direction, the lever 174 moves accordingly which results in rotation of the rod 176 in either clockwise or counterclockwise direction. This direction of movement is recorded by the potentiometer and what direction away from the null position is transmitted to the computer. The computer then activates motor 160 which causes the housing 150 to be moved in such a manner so as to place the electrode 46 within the center of the welding groove.

At the time the apparatus 48 is initially mounted upon the pipe assembly, the wheel 166 and the electrode 46 are located in a position above the surface of the pipe assembly. Upon the device 48 being fixedly mounted upon pipe 32, it is desired to locate the electrode 46 within the welding groove. The computer mechanism causes the welding electrode 46 to be moved in a downward direction toward the pipe assembly. Also, at the same time, the wheel 166 is moved in a downward direction toward the pipe assembly until the wheel 166 comes into contact with the surface of the pipe 32. At this particular position, with the wheel 166 in contact with the pipe 32, the electrode 46 is still slightly spaced above the surface of the pipe 32. The vertical movement of the wheel 166 is permitted due to the inclusion of scissor link assembly 180. One end of the scissor link assembly 180 is attached to supporting bracket 182 which, in turn, is secured to housing 150. The other end of the scissor link assembly 180 is attached to a bracket 184 to which is fixedly secured the sleeve 170. The rod 174 extends through an appropriate opening formed within the bracket 184.

Upon the wheel 166 coming into contact with the surface of the pipe 32, the wheel 166 then proceeds to move along the surface of the pipe 32 until the wheel is displaced vertically into the welding groove. At this particular time, further movement of the wheel 166 is stopped and the welding electrode 46 is automatically moved into position adjacent the bottom of the welding groove preparatory to making the root pass weld. It is normal for purposes of increasing the weld efficiency, that the root pass be accomplished in the opposite direction of the subsequent filler passes. This direction of movement in reverse can be accomplished merely by appropriately programming the computer (not shown).

What is claimed is:

1. An automatic pipe welder comprising:
 guide means adapted to be fixedly secured to a pipe assembly;
 a carriage assembly connected to said guide means, said carriage assembly including a first carriage and a second carriage located in a spaced apart arrangement, both said first carriage and said second carriage being movable in respect to said guide means;
 motor means interconnecting said guide means and said carriage assembly for moving said first and said second carriages, a driving means connected to said guide means and located between said first carriage and said second carriage, said motor means connected with said driving means;
 welding torch means connected to said carriage assembly, said welding torch means including a first torch assembly and a second torch assembly, said first torch assembly being connected to said first carriage, said second torch assembly being connected to said second carriage, said first torch assembly being movable in a one hundred and eighty degree arc with said second torch assembly being movable in a separate one hundred and eighty degree arc and both said arcs being in the same plance thereby forming a continuous circle; upright post means located between said first carriage and said second carriage, said driving means comprising a driving chain attached to said upright post means.

2. An automatic pipe welder comprising:

guide means adapted to be fixedly secured to a pipe assembly;

a carriage assembly connected to said guide means, said carriage assembly including a first carriage and a second carriage located in a spaced apart arrangement, both said first carriage and said second carriage being movable in respect to said guide means;

motor means interconnecting said guide means and said carriage assembly for moving said first and said second carriages, a driving means connected to said guide means and located between said first carriage and said second carriage, said motor means connected with said driving means;

welding torch means connected to said carriage assembly, said welding torch means including a first torch assembly being connected to said first carriage, said second torch assembly being connected to said second carriage, said first torch assembly being movable in a one hundred and eighty degree arc with said second torch assembly being movable in a separate one hundred and eighty degree arc and both said arcs being in the same plane thereby forming a continuous circle;

said first carriage being mounted by low frictional rollers on a first guide track included with said guide means, said second carriage being mounted by low frictional rollers on a second guide track included within said guide means, both said first guide track and said second guide track being equidistantly spaced from the outer wall of said pipe assembly;

both said first guide track and said second guide track including low frictional guide blocks, said first carriage including a first carriage ring which is in contact with said low frictional guide blocks within said first guide track, said second carriage including a second carriage ring which is in contact with said low frictional guide blocks within said second guide track, said low frictional guide blocks to facilitate low frictional movement of said first and second carriage rings in respect to its respective said guide track; and upright post means located between said first guide track and said second guide track, said driving means comprising a driving chain attached to said upright post means.

3. The welder as defined in claim 2 wherein:

said first torch assembly including two separate welding torches, said second torch assembly including another two separate welding torches.

4. An automatic pipe welder comprising:

guide means adapted to be fixedly secured to a pipe assembly;

a carriage assembly connected to said guide means, said carriage assembly including a first carriage and a second carriage located in a spaced apart arrangement, both said first carriage and said second carriage being movable in respect to said guide means;

motor means interconnecting said guide means and said carriage assembly for moving said first and said second carriages, a driving means connected to said guide means and located between said first carriage and said second carriage, said motor means connected with said driving means;

welding torch means connected to said carriage assembly, said welding torch means including a first torch assembly and a second torch assembly, said first torch assembly being connected to said first carriage, said second torch assembly being connected to said second carriage, said first torch assembly being movable in a one hundred and eighty degree arc with said second torch assembly being movable in a separate one hundred and eighty degree arc and both said arcs being in the same plane thereby forming a continuous circle; and welding groove tracking means connected to said first torch assembly and said second torch assembly with there being a separate tracking device for each of said torch assembly, each said tracking device including a roller to be positioned within the welding groove with said roller being adapted to assist in maintaining its respective said torch assembly correctly aligned within the welding groove, each said tracking device including a scissor linkage which permits said device to be movable toward and away from the pipe assembly.

5. An automatic pipe welder comprising:

guide means adapted to be fixedly secured to a pipe assembly;

a carriage assembly connected to said guide means, said carriage assembly including a first carriage and a second carriage located in a spaced apart arrangement, both said first carriage and said second carriage being movable in respect to said guide means;

motor means interconnecting said guide means and said carriage assembly for moving said first and said second carriages;

welding torch means connected to said carriage assembly, said welding torch means including a first torch assembly and a second torch assembly, said first torch assembly being connected to said first carriage, said second torch assembly being connected to said second carriage, said first torch assembly being movable in a one hundred and eighty degree arc with said second torch assembly being movable in a separate one hundred and eighty degree arc and both said arcs being in the same plane thereby forming a continuous circle;

said first carriage being mounted by low-frictional rollers on a first guide track included within said guide means, said second carriage being mounted by low-frictional rollers on a second guide track included within said guide means, both said first guide track and said second guide track being equidistantly spaced from the outer wall of said pipe assembly;

both said first guide track and said second guide track including low-frictional guide blocks, said first carriage including a first carriage ring which is in contact with said low-frictional guide blocks within said first guide track, said second carriage including a second carriage ring which is in contact with said low-frictional guide blocks within said second guide track, said low-frictional guide blocks to facilitate low-frictional movement of said first and second carriage rings in respect to its respective said guide track; and upright post means located between said first guide track and said second guide track, driving chain means connected to said upright post means, said driving chain means being connected to said motor means.

6. The welder as defined in claim 5 wherein:
said first torch assembly including two separate welding torches, said second torch assembly including two separate welding torches.

* * * * *